(12) United States Patent
Okayama

(10) Patent No.: US 6,574,392 B2
(45) Date of Patent: Jun. 3, 2003

(54) WAVELENGTH ROUTER

(75) Inventor: Hideaki Okayama, Tokyo (JP)

(73) Assignee: Oki Electric Industry, Co., Ltd. (JP)

( * ) Notice: Subject to any disclaimer, the term of this patent is extended or adjusted under 35 U.S.C. 154(b) by 0 days.

(21) Appl. No.: 09/900,164

(22) Filed: Jul. 9, 2001

(65) Prior Publication Data

US 2002/0057867 A1 May 16, 2002

(30) Foreign Application Priority Data

Nov. 16, 2000  (JP) ........................................ 2000-349543

(51) Int. Cl.$^7$ ............................ G02B 6/293; H04J 14/02
(52) U.S. Cl. ........................... 385/24; 359/127; 359/130
(58) Field of Search .......................... 385/24; 259/127, 259/130

(56) References Cited

U.S. PATENT DOCUMENTS

| | | | | |
|---|---|---|---|---|
| 5,422,968 A | * | 6/1995 | Hanatani et al. | 385/22 |
| 5,488,500 A | * | 1/1996 | Glance | 359/127 |
| 6,084,992 A | * | 7/2000 | Weber et al. | 359/123 |
| 6,377,375 B1 | * | 4/2002 | Taga et al. | 359/127 |
| 6,411,411 B1 | * | 6/2002 | Okazaki et al. | 359/127 |
| 2001/0008450 A1 | * | 7/2001 | Nakazawa | 359/124 |
| 2002/0061162 A1 | * | 5/2002 | Okayama | 385/24 |

OTHER PUBLICATIONS

T. Nakazawa et al., "Reduction of AOTF Beat Noise", Shingaku Giho, PS99–68, pp. 31–35, Jan. 2000.

* cited by examiner

Primary Examiner—John D. Lee
Assistant Examiner—Tina M Lin
(74) Attorney, Agent, or Firm—Venable; James R. Burdett

(57) ABSTRACT

The present invention seeks to increase the number of wavelengths capable of being handled while reducing the sub peak and beat noise. A wave router acording to the invention has three acoustooptical filter elements; two wavelength division multiplicity reduction elements; and two wavelength division multiplexers. The wavelength division multiplicity reduction elements have three output ports and one input port, and the wavelength division multiplexing optical signal input to this input port is de-multiplexed and thereafter output from the three output ports. The acoustooptical filter elements are connected to the output ports of the wavelength division multiplicity reduction element, and the optical signal contained in the output light from thee output ports are selectively output in accordance with the wavelength.

13 Claims, 6 Drawing Sheets

WAVELENGTH ROUTER

BACKGROUND OF THE INVENTION

1. Field of the Invention

The present invention relates to a wavelength router for selectively outputting optical signals from a plurality of input ports to a plurality of output ports.

2. Description of Related Art

Conventionally, known are wavelength routers employing (1) a combination of a wavelength division multiplexing and de-multiplexing element and a light switch, (2) a combination of an array waveguide diffraction grating and a phase element, and (3) a variable optical fiber grating. These wavelength router devices can be classified broadly into a type which switches the path of signals per wavelength after having separated every wavelength division multiplexing signal into signals of respective wavelengths (includes aforementioned (1) and (2)), and a type which switches the path only for signals with a specific wavelength (includes aforementioned (3)). Pursuant to the increase in traffic capacity, it is preferable to use the wavelength router device of the latter type as the number of wavelength channels is increasing rapidly at a rate of exceeding 1000 waves.

The latter type of wavelength router devices includes, for example, a wavelength router device employing the variable optical fiber grating. With this device, the number of signals in which the path thereof may be switched; that is, the number of wavelengths, coincides with the number of elements (variable optical fiber gratings). Moreover, there is a wavelength router device employing the acoustooptical (AO) filter element. With this device, it is possible to control a plurality of wavelengths with a single acoustooptical filter element.

A wavelength router device employing the acoustooptical filter element is disclosed in the document, "Shingaku Giho, PS99-68, pp. 31–35, January 2000".

The structure and method of using a typical acoustooptical filter element is now explained with reference to the plan view of FIG. 6. The acoustooptical filter element 10 comprises two input ports 12a and 12b, and two output ports 14a and 14b. For instance, the path from the input port 12a to the output port 14a is used as the trunk line. Here, the input port 12b is used as the optical signal insertion port and the output port 14b is used as the optical signal removal port. Such usage is referred to as OADM (Optical Add Drop Multiplexing).

The acoustooptical filter 10 is also structured by employing a substrate 16 having an acoustooptical effect. An optical wave guide is formed between the input port and output port of this substrate 16. Further, polarizers 18 and 20 are respectively formed in the area of the input side and output side of the substrate 16 in the middle of such optical wave guide.

The polarizer 18 on the input side outputs the input light from the input port 12a or 12b after separating it into two mutually perpendicular polarized components. The polarizer 20 on the output side combines the polarized components input thereto, and outputs this to the output port 14a or 14b. Polarized light non-dependency is thus realized.

In addition, a comb-shaped electrode 22 is provided between the polarizers 18 and 20 of the substrate 16 and in a position on the input side close to the polarizer 18. Upon applying a high-frequency voltage to this comb-shaped electrode 22, a surface acoustic wave 24 is excited on the surface of the substrate 16. Among the polarized light propagating between the polarizers 18 and 20, only the light component corresponding to the wavelength of the surface acoustic wave is converted into polarized light. Light converted into polarized light is separated from other light at the polarizer 20 of the output side. By exciting the surface acoustic wave with a plurality of frequencies with the comb-shaped electrode 22, it is possible to select light of a plurality of wavelengths corresponding thereto.

However, acoustooptical filter elements have limited input drive power as the electrodes may be damaged, etc. Therefore, a wavelength router employing acoustooptical filter elements are restricted in the number of wavelengths that it can handle.

Moreover, as acoustooptical filter elements have inferior wavelength resolution, there are problems in that a sub peak may arise next to the main peak in the wavelength spectrum, or beat noise may appear on the main peak if the wavelength approaches even further. Thus, a wavelength router employing acoustooptical filter elements is not capable of accommodating high density wavelength division multiplexing.

SUMMARY OF THE INVENTION

Accordingly, a first object of the present invention is to provide a wavelength router suitable for processing signals in wavelength division multiplexing.

A second object of the present invention is to provide a wavelength router capable of reducing the sub peak and reducing the beat noise in the output light.

A third object of the present invention is to provide a wavelength router capable of selecting and outputting a specific signal or a plurality of signals from a plurality of multiplexed wavelength signal groups.

The wavelength router of the present invention comprises a wavelength division multiplicity reduction element and an acoustooptical filter element. The wavelength division multiplicity reduction element has a plurality of output ports and de-multiplexes the input wavelength division multiplexing optical signals and outputs the de-multiplexed optical signals to the output ports, respectively. The acoustooptical filter element is connected to the output ports of the wavelength division multiplicity reduction element, and selectively outputs the optical signals input from the output ports in accordance with the wavelength thereof.

According to this structure, as the multiplexing of the wavelength division multiplexing optical signal is reduced at the stage prior to being input to the acoustooptical filter element, it is suitable for processing high density wavelength division multiplexing signals and allows the reduction of the sub peak in the output optical signals and reduction of the beat noise.

BRIEF DESCRIPTION OF THE DRAWINGS

The foregoing and other objects, features and advantages of the present invention will be understood from the following description taken in connection with accompanying drawings, in which.

DESCRIPTION OF THE PREFERRED EMBODIMENTS

In the following, embodiments of the present invention will be described with reference to the accompanying drawings. Note that the drawings are only for schematically showing shapes, sizes and positional relationships for purpose of enabling the understanding of the present invention, and are not intended as a definition of the limits of the invention.

First Embodiment

Figure 1:
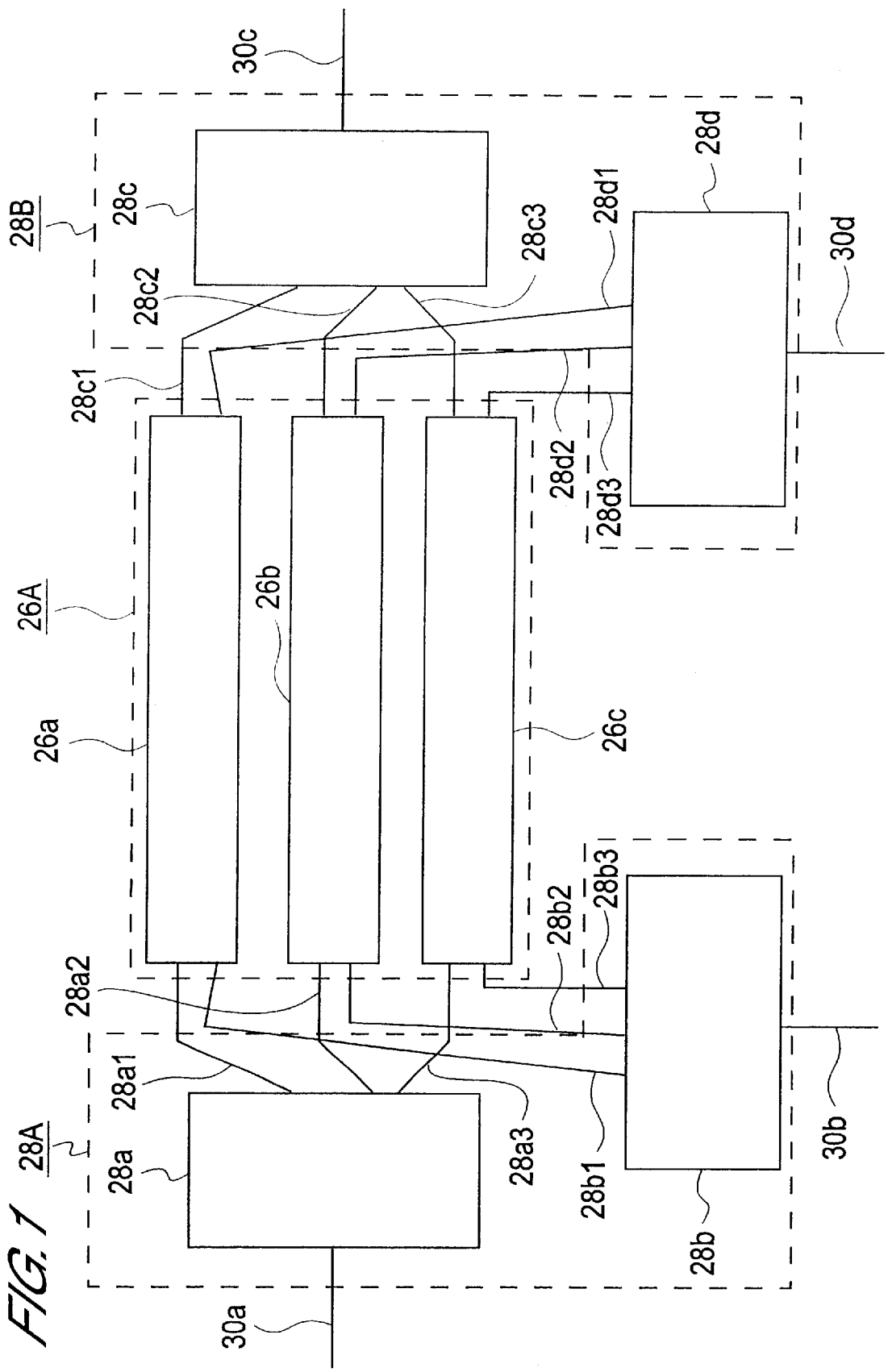
FIG. 1 is a diagram showing the structure of the wavelength router according to the first embodiment of this invention.

FIG. 1 is a block diagram showing the structure of the wavelength router according to the first embodiment. In this embodiment, the wavelength router comprises a filter element 26A, wavelength division multiplicity reduction section 28A, and wavelength division multiplexing section 28B. The filter element 26A is constituted by an acoustooptical filter element of N rows and M columns, and, here, the filter element 26A has an (3×1) alignment of N=3 and M=1. Therefore, in this case, the wavelength router comprises three acoustooptical filter elements 26a, 26b and 26c. Moreover, the wavelength division multiplicity reduction section 28A comprises wavelength division multiplicity reduction elements 28a and 28b. The wavelength division multiplexing section 28B comprises wavelength division multiplexers 28c and 28d. Here, the wavelength number P of optical signals that can be input to the wavelength division multiplicity reduction elements 28a and 28b is an integral number of P≧N. In this embodiment, for example, explanation will be made on an example in which this wavelength number P is 12.

For instance, each of the wavelength division multiplicity reduction elements 28a and 28b on the input side has three output ports and one input port. Wavelength division multiplexing optical signals input to this input port are de-multiplexed, and then output to the three output ports, respectively. This wavelength division multiplicity reduction element is sometimes referred to as a wavelength splitter. As a typical wavelength splitter, there is a Mach-Zehnder interferometer.

Figure 6:
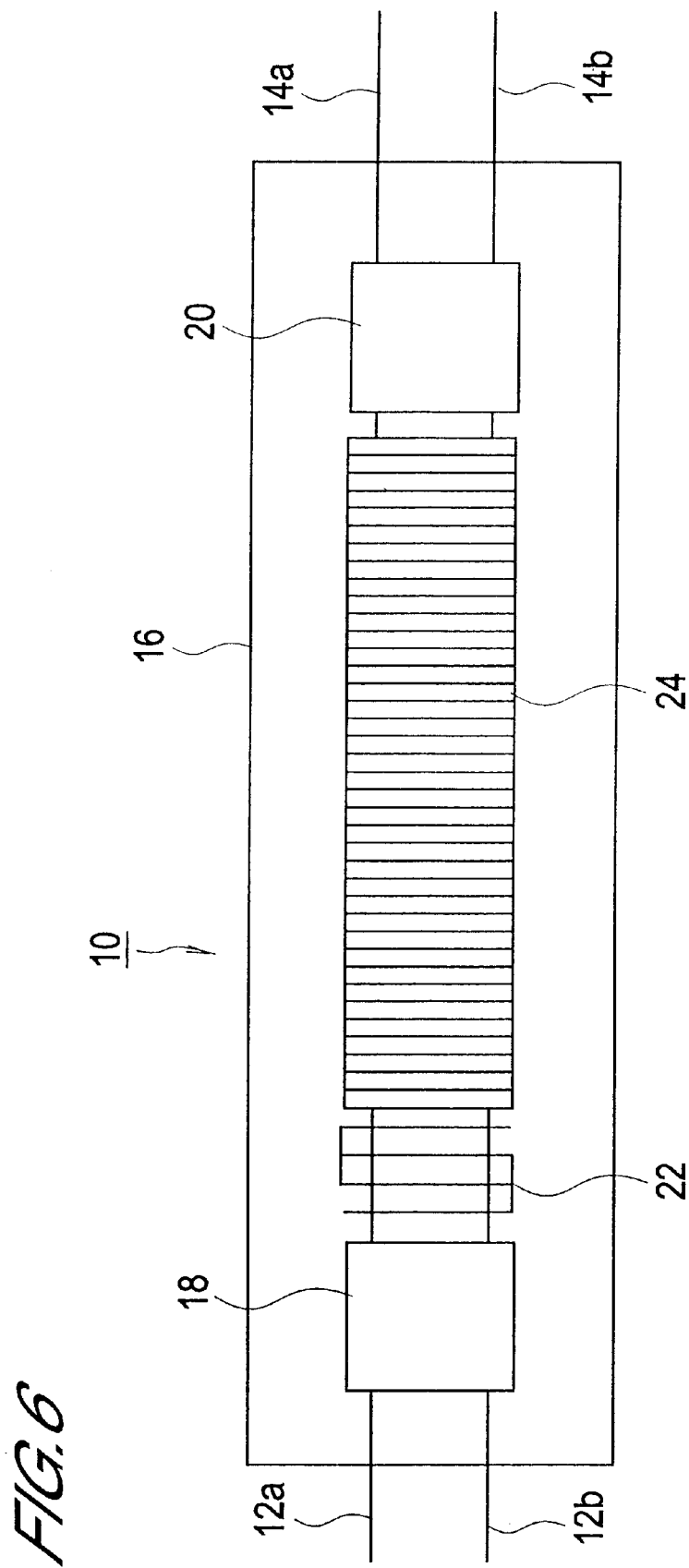
FIG. 6 is a diagram showing the structure of a typical acoustooptical filter element used in the present invention.

The acoustooptical filter elements 26a to 26c themselves are ordinary acoustooptical filter elements as described with reference to FIG. 6. These acoustooptical filter elements 26a to 26c are connected to the output ports of the wavelength division multiplicity reduction elements 28a and 28b.

In other words, the first output port 28a1 of the wavelength division multiplicity reduction element 28a is connected to the first input port of the acoustooptical filter element 26a. Moreover, the second output port 28a2 of the wavelength division multiplicity reduction element 28a is connected to the first input port of the acoustooptical filter element 26b. Further, the third output port 28a3 of the wavelength division multiplicity reduction element 28a is connected to the first input port of the acoustooptical filter element 26c.

In addition, the first output port 28b1 of the wavelength division multiplicity reduction element 28b is connected to the second input port of the acoustooptical filter element 26a. Further, the second output port 28b2 of the wavelength division multiplicity reduction element 28b is connected to the second input port of the acoustooptical filter element 26b. Moreover, the third output port 28b3 of the wavelength division multiplicity reduction element 28b is connected to the second input port of the acoustooptical filter element 26c.

When the optical signals output from the output port of the wavelength division multiplicity reduction element are input, these acoustooptical filter elements 26a to 26c selectively output the optical signals contained in such input optical signals in accordance with the wavelength.

Further, the wavelength division multiplexers 28c and 28d on the output side has the same structure as the wavelength division multiplicity reduction elements 28a and 28b on the input side. However, in the case of wavelength division mulitplexers, the input port and the output port are used in reverse such that the input port of the reduction elements is used as the output port, and the output port of the reduction elements is used as the input port. These wavelength division multiplexers 28c and 28d comprise three input ports and one output port, respectively. The wavelength division multiplexing optical signals input to these input ports are multiplexed, and then output from the output ports.

Then, the first input port 28c1 of the wavelength division multiplexer 28c is connected to the first output port of the acoustooptical filter element 26a. Moreover, the second input port 28c2 of the wavelength division multiplexer 28c is connected to the first output port of the acoustooptical filter element 26b. Further, the third input port 28c3 of the wavelength division multiplexer 28c is connected to the first output port of the acoustooptical filter element 26c.

In addition, the first input port 28d1 of the wavelength division multiplexer 28d is connected to the second output port of the acoustooptical filter element 26a. Further, the second input port 28d2 of the wavelength division multiplexer 28d is connected to the second output port of the acoustooptical filter element 26b. Moreover, the third input port 28d3 of the wavelength division multiplexer 28d is connected to the second output port of the acoustooptical filter element 26c.

With this wavelength router, the path from the input port 30a of the wavelength division multiplicity reduction element 28a to the output port 30c of the wavelength division multiplexer 28c is used as the trunk line. Here, the input port 30b of the wavelength division multiplicity reduction element 28b is used as the optical signal insertion port, and the output port 30d of the wavelength division multiplexer 28d is used as the optical signal removal port.

Optical signals are input to the trunk line from a signal insertion circuit, and optical signals are output from this trunk line to a signal removal circuit. However, in this specification, explanation on the processing on the trunk line path will be omitted as the present invention is directed to the processing on the signal insertion and removal paths.

The operation of the wavelength router of this embodiment is now explained with reference to FIG. 2. FIGS. 2A, 2B and 2C respectively illustrate the wavelength selection characteristics of the acoustooptical filter elements 26a, 26b and 26c. FIG. 2D depicts wavelength division multiplexing optical signals output from the output port 30d. The horizontal axis in the respective diagrams represents the wavelengths, and the vertical axis represents the relative intensities (in an arbitrary unit).

Wavelength division multiplexing optical signals input to the input port 30b are input to the aforementioned wavelength division multiplicity reduction element 28b. The wavelength division multiplicity reduction element 28b divides the optical signals of various wavelengths contained in the input wavelength division multiplexing optical signals into three groups, and outputs the respective groups to output ports 28b1, 28b2 and 28b3. Optical signals output to the output ports 28b1, 28b2 and 28b3 are respectively input to the acoustooptical filter elements 26a, 26b and 26c.

A plurality of optical signals (12 in this case) having successively longer wavelengths are input to the input port 30b of the wavelength division multiplicity reduction element 28b. These optical signals are referred to, from the shortest in the order of wave length, as 32a1, 32b1, 32c1, 32a2, 32b2, 32c2, 32a3, 32b3, 32c3, 32a4, 32b4 and 32c4. In the present embodiment, the adjacent wavelength intervals are mutually equivalent. Further, the wavelength division multiplicity reduction element 28b divides the input optical signals into three signal groups and separately outputs such signal groups from output ports 28b1, 28b2 and 28b3, respectively. It is necessary for the wavelengths contained in the same signal group to mutually have sufficient distance therebetween in order to prevent the generation of sub peaks and beat noises in the acoustooptical filter elements 26a, 26b and 26c. Thus, in this embodiment, a signal group is formed by selecting every third wavelength. Therefore, optical signals are output after being divided into three signal groups consisting of a group of the first, fourth and seventh wavelengths; a group of the second, fifth and eighth wavelengths; and a group of the third, sixth and ninth wavelengths.

As shown in FIG. 2A, optical signals 32a1, 32a2, 32a3 and 32a4 of four wavelengths are input to the acoustooptical filter element 26a pursuant to the function of the wavelength division multiplicity reduction element 28b. The wavelengths of these optical signals 32a1, 32a2, 32a3 and 32a4 grow longer in this order.

As shown in FIG. 2B, optical signals 32b1, 32b2, 32b3 and 32b4 of four wavelengths are input to the acoustooptical filter element 26b pursuant to the function of the wavelength division multiplicity reduction element 28b. The wavelengths of these optical signals 32b1, 32b2, 32b3 and 32b4 are longer in this order.

As shown in FIG. 2C, optical signals 32c1, 32c2, 32c3 and 32c4 of four wavelengths are input to the acoustooptical filter element 26c pursuant to the function of the wavelength division multiplicity reduction element 28b. The wavelengths of these optical signals 32c1, 32c2, 32c3 and 32c4 are longer in this order.

As described above, wavelength division multiplexing optical signals containing the aforementioned optical signals 32a1 to 32a4, 32b1 to 32b4 and 32c1 to 32c4 are input to the input port 30b. These wavelength division multiplexing optical signals are divided into three groups; that is, 32a1 to 32a4, 32b1 to 32b4 and 32c1 to 32c4 pursuant to the wavelength division multiplicity reduction element 28b. The wavelength of these optical signals are larger in the order of 32a1, 32b1, 32c1, 32a2, 32b2, 32c2, 32a3, 32b3, 32c3, 32a4, 32b4 and 32c4. Therefore, the multiplicity of the wavelength division multiplexing optical signals input to the input port 30b is reduced by the wavelength division multiplicity reduction element 28b. Here, the wavelength division multiplicity reduction element 28b de-multiplexes the respective wavelengths at wavelength intervals broader than the full width half maximum of the acoustooptical filter elements 26a, 26b and 26c.

As shown in FIG. 2A, the wavelength transmission bands (or ranges) 34a1 and 34a2 of the acoustooptical filter element 26a are respectively set as the wavelength band (or range) for transmitting optical signals 32a1 and 32a2. Thus, in the acoustooptical filter element 26a, optical signals 32a1 and 32a2 are selected and output.

As shown in FIG. 2B, the wavelength transmission band (or range) 34b1 of the acoustooptical filter element 26b is set as the wavelength band for transmitting optical signal 32b2. Thus, in the acoustooptical filter element 26b, optical signal 32b2 is selected and output.

As shown in FIG. 2C, the wavelength transmission bands (or ranges) 34c1, 34c2 and 34c3 of the acoustooptical filter element 26c are respectively set as the wavelength band for transmitting optical signals 32c2, 32c3 and 32c4. Thus, in the acoustooptical filter element 26c, optical signals 32c2, 32c3 and 32c4 are selected and output.

The setting of the transmission band of the respective acoustooptical filter elements may be carried out whenever necessary. For example, it is possible to make such setting at the break of signals between morning and afternoon, or at the break of signals at a frequency of once a month. Moreover, the setting of band or deletion of bands may be conducted by system control while monitoring the network capacity.

The optical signals output from the acoustooptical filter elements 26a, 26b and 26c are respectively input to the input ports 28d1, 28d2 and 28d3 of the wavelength division multiplexer 28d. These optical signals are multiplexed by the wavelength division multiplexer 28d, and output to the output port 30d. As shown in FIG. 2D, the output light from the output port 30d is a wavelength division multiplexing optical signal containing optical signals 32a1, 32a2, 32b2, 32c2, 32c3 and 32c4.

Figure 2:
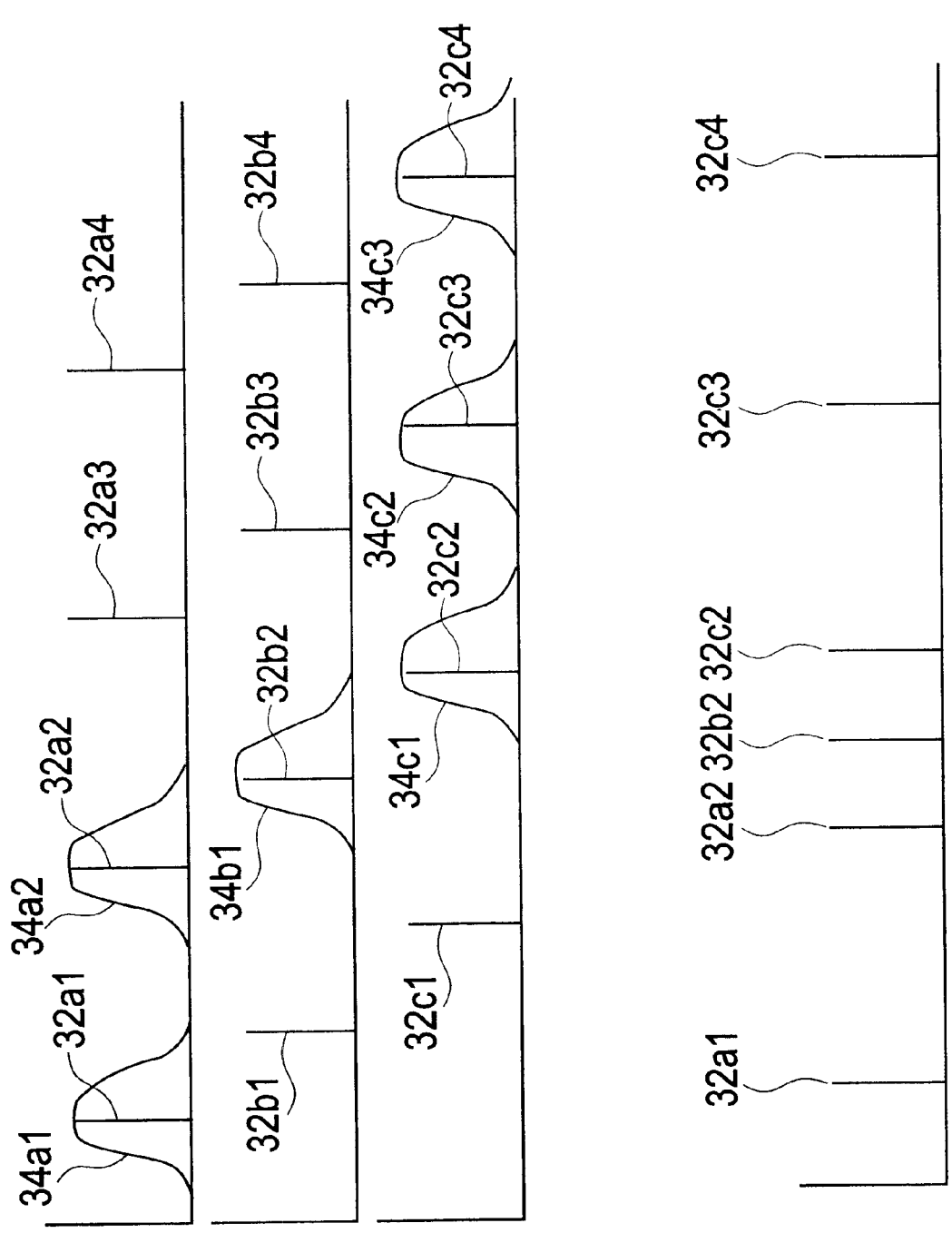
FIG. 2A illustrates the wavelength characteristics of an acoustoopical filter element of an embodiment of the present invention.
FIG. 2B illustrates the wavelength characteristics of an acoustoopical filter element of an embodiment of the present invention.
FIG. 2C illustrates the wavelength characteristics of an acoustoopical filter element of an embodiment of the present invention.
FIG. 2D illustrates the wavelength characteristics of an acoustoopical filter element of an embodiment of the present invention.

As shown in FIG. 2, transmission bands (or ranges) 34a2 and 34b1 would normally overlap, and it would not be possible to select optical signals 32a2 and 32b2 unless a large cross talk is generated. However, according to the wavelength router of the present embodiment, it is possible to select such optical signals without generating any cross talk by combining the wavelength division multiplicity reduction element and a plurality of acoustooptical filter elements.

Thus, according to the wavelength router of the present embodiment, when the number of wavelengths capable of being handled by the acoutooptical filter element is n (n is a natural number), it is possible to control N number of wavelengths with N/n (N is a natural number) number of elements. In other words, it is possible to control the wavelength density of n/N of the wavelength density capable of being handled by the acoustooptical filter element.

Second Embodiment

Figure 3:
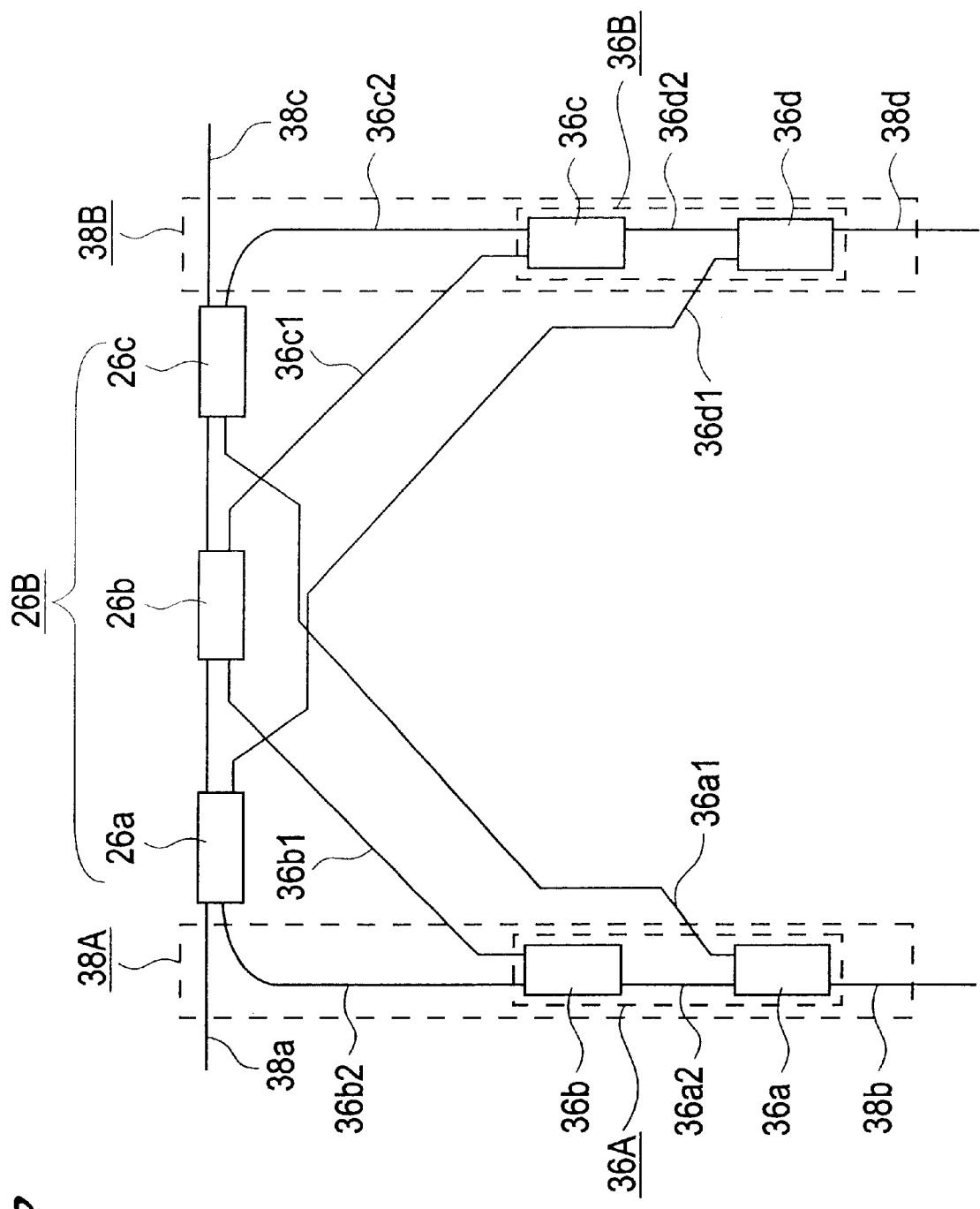
FIG. 3 is a diagram showing the structure of the wavelength router according to the second embodiment of this invention.

The wavelength router according to the second embodiment is now explained. FIG. 3 is a block diagram showing the structure of the wavelength router according to the second embodiment. The wavelength router of the second embodiment has a structure wherein a plurality of acoustooptical filter elements are connected serially.

The wavelength router shown in FIG. 3 comprises a wavelength division multiplicity reduction section 38A, filter section 26B, and wavelength division multiplexing section 38B. The wavelength division multiplicity reduction section 38A has a single 1 input port×3 output ports-type wavelength division multiplicity reduction element 36A. This reduction element 36A has first and second sub wavelength division multiplicity reduction elements 36a and 36b. These first and second sub reduction elements 36a and 36b are of a 1 input port×2 input ports-type structure. There is a single input port 38b in the first sub reduction element 36a, and one of the output ports 36a2 of this element 36a is connected to the input port of the second sub reduction element 36b.

The filter section 26B comprises acoustooptical filter elements 26a, 26b and 26c arranged in a 1 row/3 column matrix. The other output port 36a1 of the first sub reduction element 36a is connected to the second input port of the third column filter element 26c, and one of the output ports 36b2 and the other output port 36b1 of the second sub reduction element 36b are respectively connected to the second input ports of the first column and second column filter elements 26a and 26b.

The wavelength division multiplexing section 38B has a single 3 input ports×1 output port-type wavelength division multiplexing element 36B. This wavelength division multiplexing element 38B comprises first and second sub wavelength division multiplexers 36d and 36c. These first and second sub wavelength division multiplexers 36d and 36c are of a 2 input ports×1 output port-type structure. Input ports 36c1 and 36c2 of the second sub wavelength division multiplexing element 36c are respectively connected to the second output ports of the second column and third column filter elements 26b and 26c. Moreover, one of the input ports 36d1 of the first sub wavelength division multiplexing element 36d is connected to the second output port of the first column filter element 26a and the other input port 36d2 is connected to the second output port of the second sub wavelength division multiplexing element 36c. There is one output port 38d of this element 36c.

It is preferable to respectively structure the aforementioned first and second sub reduction elements 36a and 36b with wavelength splitters. With the two second sub reduction elements 36a and 36b, the wavelength division multiplexing optical signals input to this input port are multiplexed and thereafter output to the two output ports, respectively. The structure of these first and second sub wavelength division multiplicity reduction elements 36a and 36b is substantially the same as the wavelength division multiplicity reduction elements 28a and 28b described in the first embodiment, and merely differ in the number of output ports.

The acoustooptical filter elements 26a to 26c are of the same structure as the acoustooptical filter elements 26a to 26c described in the first embodiment.

These acoustooptical filter elements 26a to 26c selectively output the optical signals contained in the output light from the output ports 36a1, 36b and 36b2 of the wavelength division multiplicity reduction element 36A.

Moreover, first and second sub wavelength division multiplexers 36d and 36c on the output side are of the same structure as the first and second wavelength division multiplicity reduction elements 36a and 36b on the input side. However, the input ports and output ports are used in reverse. The wavelength division multiplexing optical signals input to the input ports 36d1, 36c1 and 36c2 of the sub wavelength division multiplexers 36c and 36d are multiplexed and thereafter output to the output port 38d.

Meanwhile, with this wavelength router, the first output port of the acoustooptical filter element 26a and the first input port of the acoustooptical filter element 26b are connected, and the first output port of the acoustooptical filter element 26b and the first input port of the acoustooptical filter element 26c are connected.

The path from the first input port 38a of the acoustooptical filter element 26a to the output port 38c of the acoustooptical filter element 26c is used as the trunk line. Here, the input port 38b of the first sub wavelength division multiplicity reduction element 36a is used as the optical signal insertion port, and the output port 38d of the first sub wavelength division multiplexer 36d is used as the optical signal removal port.

According to this structure, although the improvement in the cross talk pursuant to the wavelength resolution of the acoustooptical filter element cannot be expected, there is an advantage in that the number of wavelengths capable of being handled with a single acoustooptical filter element is reduced. Moreover, as the number of wavelengths capable of being handled per element is low, it is possible to prevent the generation of beat noise between the adjacent wavelengths by broadening the interval between the wavelengths.

Third Embodiment

Figure 4:
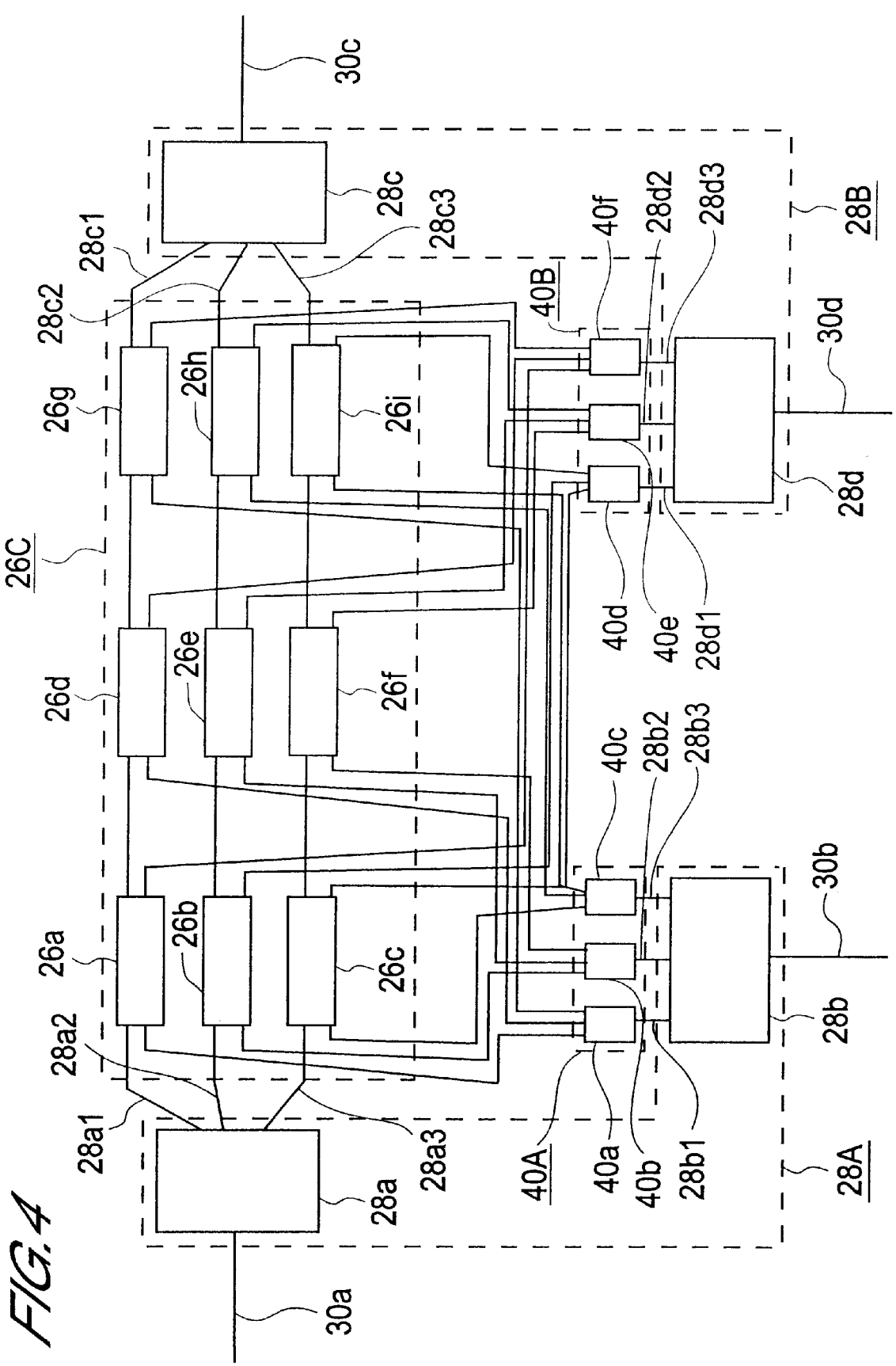
FIG. 4 is a diagram showing the structure of the wavelength router according to the third embodiment of this invention.

A wavelength router according to the third embodiment is now explained. FIG. 4 is a block diagram showing the structure of the wavelength router according to the third embodiment. The wavelength router of the third embodiment comprises a structure combining the structure of the first embodiment and the structure of the second embodiment.

This wavelength router is similar to the first embodiment in that it comprises a wavelength division multiplicity reduction section and wavelength division multiplexing section of the same structure as the wavelength division multiplicity reduction section 28A and wavelength division multiplexing section 28B described in the first embodiment, but is different from the first embodiment in the other constituent elements.

This wavelength router comprises a filter section 26C containing nine acoustooptical filter elements 26a to 26i arranged in 3 rows and 3 columns, two wavelength division multiplicity reduction elements 28a and 28b, two wavelength division multiplexers 28c and 28d, and first and second wavelength division multiplexing and de-multiplexing sections 40A and 40B respectively constituted by three wavelength division multiplexing and de-multiplexing elements 40 to 40c, 40d to 40f.

The wavelength division multiplicity reduction elements 28a and 28b on the input side respectively comprise three output ports 28a1 to 28a3, 28b1 to 28b3, and one input port 30a, 30b. The wavelength division multiplexing optical signals input to this input port are multiplexed and thereafter output to the three output ports, respectively. These wavelength division multiplicity reduction elements 28a and 28b are of the same structure as the wavelength division multiplicity reduction elements 28a and 28b described in the first embodiment, and may respectively be constituted by a wavelength splitter.

The acoustooptical filter elements 26a to 26i are of the same structure as the acoustooptical filter elements 26a~26c described in the first embodiment. These acoustooptical filter elements 26a to 26i are connected to the output ports of the wavelength division multiplicity reduction elements 28a and 28b.

In other words, the first output port 28a1 of the wavelength division multiplicity reduction element 28a is connected to the first input port of the acoustooptical filter element 26a. Moreover, the second output port 28a2 of the wavelength division multiplicity reduction element 28a is connected to the first input port of the acoustooptical filter element 26b. Further, the third output port 28a3 of the wavelength division multiplicity reduction element 28a is connected to the first input port of the acoustooptical filter element 26c.

The first wavelength division multiplexing and de-multiplexing section 40A is provided between the wavelength division multiplicity reduction element 28b and the filter section 26C. The second wavelength division multiplexing and de-multiplexing section 40B is provided between the filter section 26C and the wavelength division multiplexer 28d. The first and second wavelength division multiplexing and de-multiplexing sections 40A and 40B are respectively constituted by three wavelength division multiplexing and de-multiplexing elements 40a to 40c, 40d to 40f.

Further, the first output port 28b1 of the wavelength division multiplicity reduction element 28b is connected to the respective second input ports of the acoustooptical filter elements 26a, 26d and 26g via the wavelength division multiplexing and de-multiplexing element 40a. Moreover, the second output port 28b2 of the wavelength division multiplicity reduction element 28b is connected to the respective second input ports of the acoustooptical filter elements 26b, 26e and 26f via the wavelength division multiplexing and de-multiplexing element 40b. In addition, the third output port 28b3 of the wavelength division multiplicity reduction element 28b is connected to the respective second input ports of the acoustooptical filter elements 26c, 26h and 26i via the wavelength division multiplexing and de-multiplexing element 40c.

These acoustooptical filter elements 26a to 26i selectively output the optical signals contained in the output light from the output port of the wavelength division multiplicity reduction element in accordance with the wavelength.

Moreover, each of the wavelength division multiplexing and de-multiplexing elements 40a, 40b and 40c of the first wavelength division multiplexing and de-multiplexing section 40A is of a 1 input port×3 output ports-type structure, and is a coupler for trisecting and outputting the power of the input light. It is also possible to use elements having the same structure as the wavelength division multiplicity reduction element as such wavelength division multiplexing and de-multiplexing elements.

Further, the wavelength division multiplexers 28c and 28d on the output side has the same structure as the wavelength division multiplicity reduction elements 28a and 28b on the input side. Nevertheless, in the case of the wavelength division mulitplexers, the input port and the output port are used in reverse such that the input port of the reduction elements can be used as the output port, and the output port of the reduction elements can be used as the input port. These wavelength division multiplexers 28c and 28d comprise three input ports and one output port, respectively. The wavelength division multiplexing optical signals input to these input ports are multiplexed, and thereafter output to the output ports.

Then, the first input port 28c1 of the wavelength division multiplexer 28c is connected to the first output port of the acoustooptical filter element 26g. Moreover, the second input port 28c2 of the wavelength division multiplexer 28c is connected to the first output port of the acoustooptical filter element 26h. Further, the third input port 28c3 of the wavelength division multiplexer 28c is connected to the first output port of the acoustooptical filter element 26i.

Further, the first output port 28d1 of the wavelength division multiplexer 28d is connected to the respective second input ports of the acoustooptical filter elements 26c, 26b and 26i via the wavelength division multiplexing and demultiplexing element 40d. Moreover, the second output port 28d2 of the wavelength division multiplexer 28d is connected to the respective second input ports of the acoustooptical filter elements 26f, 26e and 26h via the wavelength division multiplexing and de-multiplexing element 40e. In addition, the third output port 28d3 of the wavelength division multiplexer 28d is connected to the respective second input ports of the acoustooptical filter elements 26a, 26d and 26g via the wavelength division multiplexing and de-multiplexing element 40f.

Moreover, each of the wavelength division multiplexing and de-multiplexing elements 40d, 40e and 40f of the second wavelength division multiplexing and de-multiplexing section 40B is of a 3 input ports×1 output port-type structure, and is basically the same as the wavelength division multiplexing and de-multiplexing elements 40a, 40b and 40c. That is, the input ports and output ports of the wavelength division multiplexing and de-multiplexing elements having the same structure may be used in reverse.

With this wavelength router, the first output port of the acoustooptical filter element 26a and the first input port of the acoustooptical filter element 26d are connected, and the first output port of the acoustooptical filter element 26d and the first input port of the acoustooptical filter element 26g are connected. Further, the first output port of the acoustooptical filter element 26b and the first input port of the acoustooptical filter element 26e are connected, and the first output port of the acoustooptical filter element 26e and the first input port of the acoustooptical filter element 26h are connected. Moreover, the first output port of the acoustooptical filter element 26c and the first input port of the acoustooptical filter element 26f are connected, and the first output port of the acoustooptical filter element 26f and the first input port of the acoustooptical filter element 26i are connected.

The path from the first input port 30a of the wavelength division multiplicity reduction element 28a to the output port 30c of the wavelength division multiplexer 28c is used as the trunk line. Here, the input port 30b of the wavelength division multiplicity reduction element 28b is used as the optical signal insertion port, and the output port 30d of the wavelength division multiplexer 28d is used as the optical signal removal port.

According to this structure, as a plurality of acoustooptical filter elements are connected to the wavelength division multiplicity reduction element via the wavelength division multiplexing and de-multiplexing element, it is possible to decrease the number of optical signals to be selected per acoustooptical filter element. Therefore, it is possible to increase the wavelength multiplicity of the input light without increasing the number of input ports of the wavelength division multiplicity reduction element.

Fourth Embodiment

Figure 5:
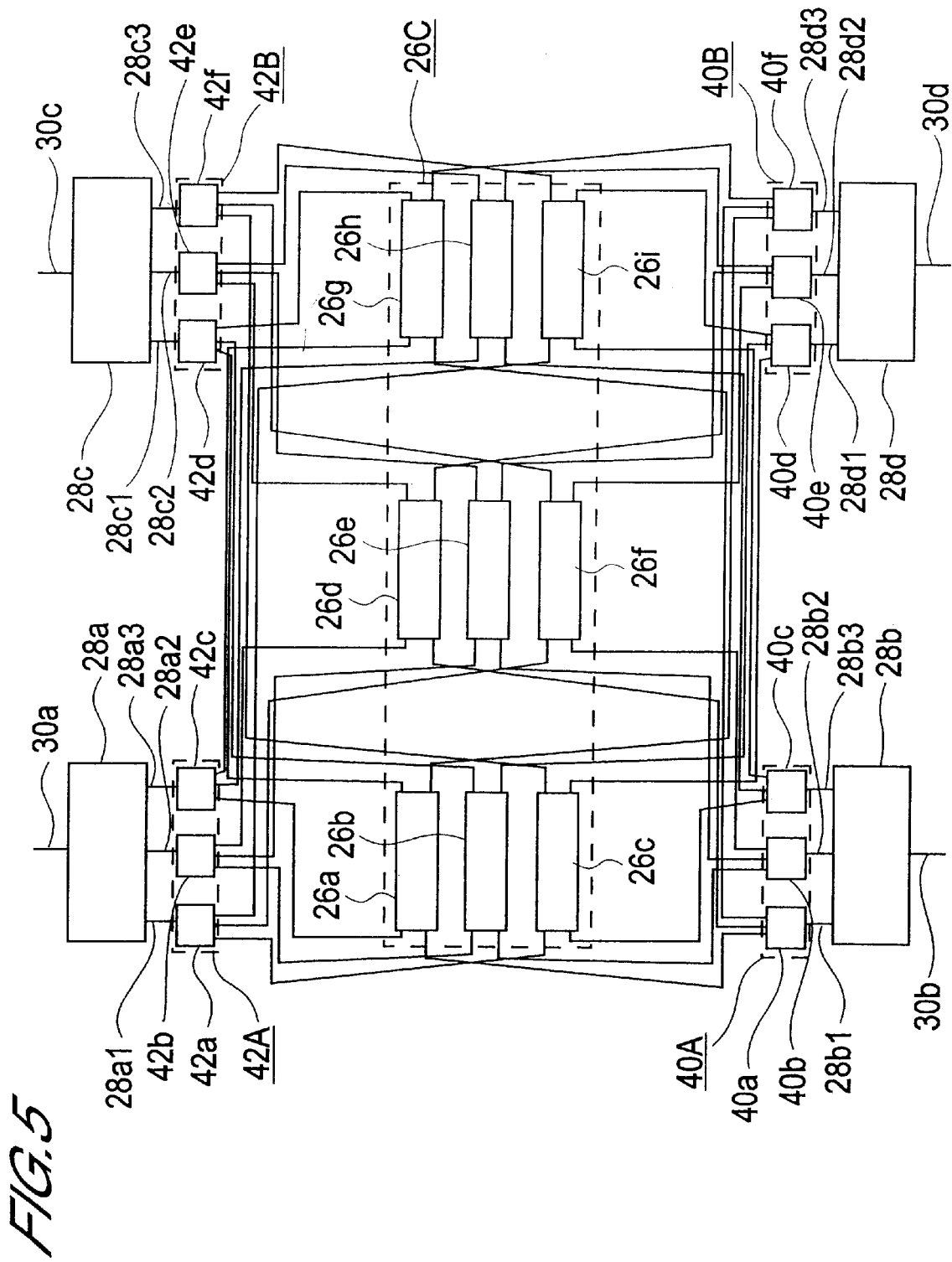
FIG. 5 is a diagram showing the structure of the wavelength router according to the fourth embodiment of this invention.

The wavelength router according to the fourth embodiment is now explained. FIG. 5 is a block diagram showing the structure of the wavelength router according to the fourth embodiment. In the wavelength router of the fourth embodiment, in addition to the wavelength router of the aforementioned third embodiment, a separate first wavelength division multiplexing and de-multiplexing section 42A is provided between the wavelength division multiplicity reduction element 28a and the filter section 26C, and a separate second wavelength division multiplexing and de-multiplexing section 42B is provided between the filter section 26C and the wavelength division multiplexer 28c.

This wavelength router comprises a total of 12 wavelength division multiplexing and de-multiplexing elements 40a to 40f and 42a to 42f including nine acoustooptical filter elements 26a to 26i, two wavelength division multiplicity reduction elements 28a and 28b, two wavelength division multiplexers 28c and 28d, two first wavelength division multiplexing and demultiplexing sections 40A and 42A, and two second wavelength division multiplexing and de-multiplexing sections 40B and 42B.

The wavelength division multiplicity reduction elements 28a and 28b on the input side respectively comprise three output ports and one input port. The wavelength division multiplexing optical signals input to this input port are multiplexed and thereafter output to the three output ports, respectively. These wavelength division multiplicity reduction elements 28a and 28b are of the same structure as the wavelength division multiplicity reduction elements 28a and 28b described in the first embodiment.

The acoustooptical filter elements 26a to 26i of the filter section 26C are of the same structure as the acoustooptical filter elements 26a to 26c described in the first embodiment. These acoustooptical filter elements 26a to 26i are connected to the output ports of the wavelength division multiplicity reduction elements 28a and 28b.

The connection between the wavelength division multiplicity reduction element 28b and wavelength division multiplexer 28d and filter section 26C is the same as with the wavelength router described in the third embodiment.

In other words, the first output port 28b1 of the wavelength division multiplicity reduction element 28b is connected to the respective second input ports of the acoustooptical filter elements 26a, 26d and 26g via the wavelength division multiplexing and de-multiplexing element 40a. Moreover, the second output port 28b2 of the wavelength division multiplicity reduction element 28b is connected to the respective second input ports of the acoustooptical filter elements 26b, 26e and 26f via the wavelength division multiplexing and de-multiplexing element 40b. In addition, the third output port 28b3 of the wavelength division multiplicity reduction element 28b is connected to the respective second input ports of the acoustooptical filter elements 26c, 26h and 26i via the wavelength division multiplexing and demultiplexing element 40c.

The connection between the wavelength division multiplicity reduction element 28b and wavelength division multiplexer 28c and filter section 26C in the fourth embodiment is now explained.

The first output port 28a1 of the wavelength division multiplicity reduction element 28a is connected to the respective first input ports of the acoustooptical filter elements 26c, 26f and 26i via the wavelength division multiplexing and de-multiplexing element 42a. Moreover, the second output port 28a2 of the wavelength division multiplicity reduction element 28a is connected to the respective first input ports of the acoustooptical filter elements 26b, 26e and 26d via the wavelength division multiplexing and de-multiplexing element 42b. In addition, the third output port 28a3 of the wavelength division multiplicity reduction element 28a is connected to the respective first input ports of the acoustooptical filter elements 26a, 26h and 26g via the wavelength division multiplexing and de-multiplexing element 42c.

These acoustooptical filter elements 26a to 26i selectively output the optical signals contained in the output light from the output port of the wavelength division multiplicity reduction element in accordance with the wavelength.

Preferably, each of the wavelength division multiplexing and de-multiplexing elements 40a to 40c and 42a to 42c is a coupler for trisecting and outputting the power of the input light.

Further, the wavelength division multiplexers 28c and 28d on the output side has the same structure as the wavelength division multiplicity reduction elements 28a and 28b on the input side. Nevertheless, in the case of the wavelength division mulitplexers, the input port and the output port are used in reverse. These wavelength division multiplexers 28c and 28d comprise three input ports and one output port, respectively. The wavelength division multiplexing optical signals input to these input ports are multiplexed, and thereafter output to the output ports.

Further, the first input port 28c1 of the wavelength division multiplexer 28c is connected to the respective first output ports of the acoustooptical filter elements 26a, 26b and 26g via the wavelength division multiplexing and demultiplexing element 42d. Moreover, the second input port 28c2 of the wavelength division multiplexer 28c is connected to the respective first output ports of the acoustooptical filter elements 26d, 26e and 26h via the wavelength division multiplexing and de-multiplexing element 42e. In addition, the third input port 28c3 of the wavelength division multiplexer 28c is connected to the respective first input ports of the acoustooptical filter elements 26c, 26f and 26i via the wavelength division multiplexing and de-multiplexing element 42f.

Further, the first input port 28d1 of the wavelength division multiplexer 28d is connected to the respective second output ports of the acoustooptical filter elements 26c, 26b and 26i via the wavelength division multiplexing and demultiplexing element 40d. Moreover, the second input port 28d2 of the wavelength division multiplexer 28d is connected to the respective second output ports of the acoustooptical filter elements 26f, 26e and 26h via the wavelength division multiplexing and de-multiplexing element 40e. In addition, the third input port 28d3 of the wavelength division multiplexer 28d is connected to the respective second output ports of the acoustooptical filter elements 26a, 26d and 26g via the wavelength division multiplexing and de-multiplexing element 40f.

The wavelength division multiplexing and de-multiplexing elements 40d to 40f and 42d to 42f are of the same structure as the wavelength division multiplexing and de-multiplexing elements 40a to 40c and 42a to 42c.

As described above, with this wavelength router, a plurality of acoustooptical filter elements are connected between the wavelength division multiplicity reduction element and the wavelength division multiplexer in parallel.

With this wavelength router, the path from the input port 30a of the wavelength division multiplicity reduction element 28a to the output port 30c of the wavelength division multiplexer 28c is used as the trunk line. Here, the input port 30b of the wavelength division multiplicity reduction element 28b is used as the optical signal insertion port, and the output port 30d of the wavelength division multiplexer 28d is used as the optical signal removal port.

The structure according to this embodiment is advantageous when there is great loss in the insertion of the acoustooptical filter element.

The number of input ports, number of output ports, and number of elements used in each of the foregoing embodiments is not limited to the examples described above, and may be arbitrarily changed.

What is claimed is:

1. A wavelength router, comprising:
   a wavelength division multiplicity reduction element having a plurality of output ports and which de-multiplexes input wavelength division multiplexing optical signals and outputs the de-multiplexed optical signals to said output ports, respectively; and an acoustooptical filter element connected to the output ports of said wavelength division multiplicity reduction element, and which selectively outputs optical signals input from said output ports in accordance with the wavelengths thereof, wherein said wavelength division multiplicity reduction element reduce the multiplexing of the wavelength division multiplexing optical signal at the stage prior to being input to said acoustooptical filter element.

2. A wavelength router according to claim 1, having a structure in which a plurality of said acoustooptical filter elements are connected in series.

3. A wavelength router according to claim 1, having a structure in which a plurality of said acoustooptical filter elements are connected in parallel.

4. A wavelength router, comprising:

a wavelength division multiplicity reduction section comprising 1 input port×N output ports-type wavelength division multiplicity reduction elements;

a filter section comprising acoustooptical filter elements arranged in a matrix of N rows and M columns; and a wavelength division multiplexing section comprising N input ports×1 output port-type wavelength division multiplexer elements;

wherein the output ports of said wavelength division multiplicity reduction element are respectively connected to said acoustooptical filter elements belonging to different rows, without overlapping mutually; and wherein said wavelength division multiplexer element has the same structure as the 1 input×N output ports-type wavelength division multiplicity reduction element; and the input port of said wavelength division multiplicity reduction element having the same structure is used as the output port of said wavelength division multiplexer element, and the output port is used as the input port of said wavelength division multiplexer element; and wherein a first wavelength division multiplexing and de-multiplexing section is provided between said wavelength division multiplicity reduction section and said filter section; and a second wavelength division multiplexing and de-multiplexing section is provided between said filter section, and said wavelength division multiplexing section said acoustooptical filter elements are respectively connected to different input ports of said wavelength division multiplexer elements, without overlapping mutually.

5. A wavelength router according to claim 4, wherein said wavelength division multiplicity reduction element is a wavelength splitter.

6. A wavelength router according to claim 4, wherein said N is 3 and said M is 1.

7. A wavelength router according to claim 4, wherein said N is 3 and said M is 3.

8. A wavelength router according to claim 4, wherein said first wavelength division multiplexing and de-multiplexing section comprises M number of 1 input×M output ports-type first wavelength division multiplexing and de-multiplexing elements connected respectively and individually to N number of output ports of said wavelength division multiplicity reduction element;

M number of output ports of one and same first wavelength division multiplexing and de-multiplexing element are connected to M number of acoustooptical filter elements belonging to the same row without overlapping mutually;

said second wavelength division multiplexing and de-multiplexing section comprises M number of M input ports×1 output port-type second wavelength division multiplexing and de-multiplexing elements connected respectively and individually to N number of input ports of said wavelength division multiplexer; and M number of acoustooptical filter elements belonging to the same row are connected to M number of input ports of one and same second wavelength division multiplexing and de-multiplexing element without overlapping mutually.

9. A wavelength router according to claim 8, wherein said first wavelength division multiplexing and de-multiplexing element is a coupler for dividing and outputting optical power in equal parts.

10. A wavelength router according to claim 8, wherein second wavelength division multiplexing and de-multiplexing element is a coupler for synthesizing and outputting optical power.

11. A wavelength router, comprising:

a wavelength division multiplicity reduction section comprising 1 input port×N output ports-type wavelength division multiplicity reduction elements;

a filter section comprising acoustooptical filter elements arranged in a matrix of N rows and M columns; and a wavelength division multiplexing section comprising N input ports×1 output port-type wavelength division multiplexer elements;

wherein the output ports of said wavelength division multiplicity reduction element are respectively connected to said acoustooptical filter elements belonging to different rows, without overlapping mutually; and wherein said N is 1 and said M is 3;

said wavelength division multiplicity reduction section is constituted by a single wavelength division multiplexing element;

said wavelength division multiplicity reduction element comprises first and second sub wavelength division multiplicity reduction elements;

said first and second sub wavelength division multiplicity reduction elements are of a 1 input port and 2 output ports-type structure;

one of the output ports of said first sub wavelength division multiplicity reduction element is connected to the input port of said second sub wavelength division multiplicity reduction element;

the other output port of said first sub wavelength division multiplicity reduction element and the two output ports of said second sub wavelength division multiplicity reduction element are connected individually to the input side of three said acoustooptical filter elements, without overlapping mutually;

said wavelength division multiplexing section is constituted by a single wavelength division multiplexer element;

said wavelength division multiplexer element comprises first and second sub wavelength division multiplexer elements;

said first and second sub wavelength division multiplexer elements are of a 2 input ports and 1 output port-type structure;

one of the input ports of said first sub wavelength division multiplexer element is connected to the output port of said second sub wavelength division multiplexer element; and the other input port of said first sub wavelength division multiplexer element and the two input ports of said second sub wavelength division multiplexer element are connected individually to the output side of three said acoustooptical filter elements without overlapping mutually.

12. A wavelength router according to claim 11, wherein each of said first and second sub wavelength division multiplicity reduction elements is a wavelength splitter.

13. A wavelength router according to claim 11, wherein said first and second sub wavelength division multiplicity reduction elements are of a 1 input port×2 output ports-type structure;

said first and second sub wavelength division multiplexer elements are of the same structure as said 1 input port×2 output ports-type first and second sub wavelength division multiplicity reduction elements; and the input port of said first and second sub wavelength division multiplicity reduction elements having the same structure is used as the output port of said first and second sub wavelength division multiplexer elements, and the output port is used as the input port of said wavelength division multiplexer element.

* * * * *